Aug. 28, 1923.
J. W. LATIMER
1,466,054
WATER TIGHT PIPE CONDUIT
Filed Nov. 18, 1919    2 Sheets-Sheet 1
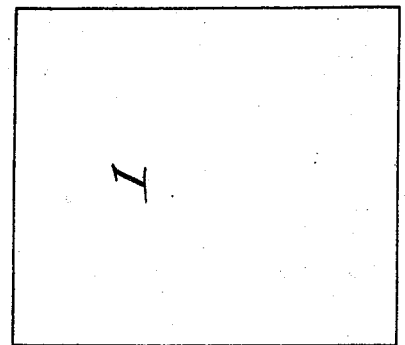
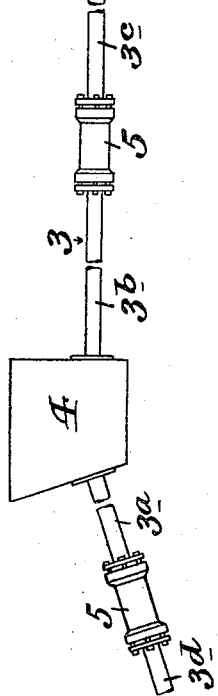
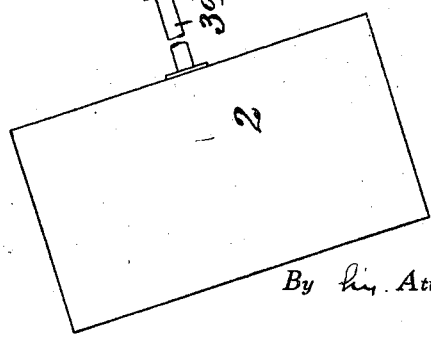
Inventor
John W. Latimer
By his Attorney

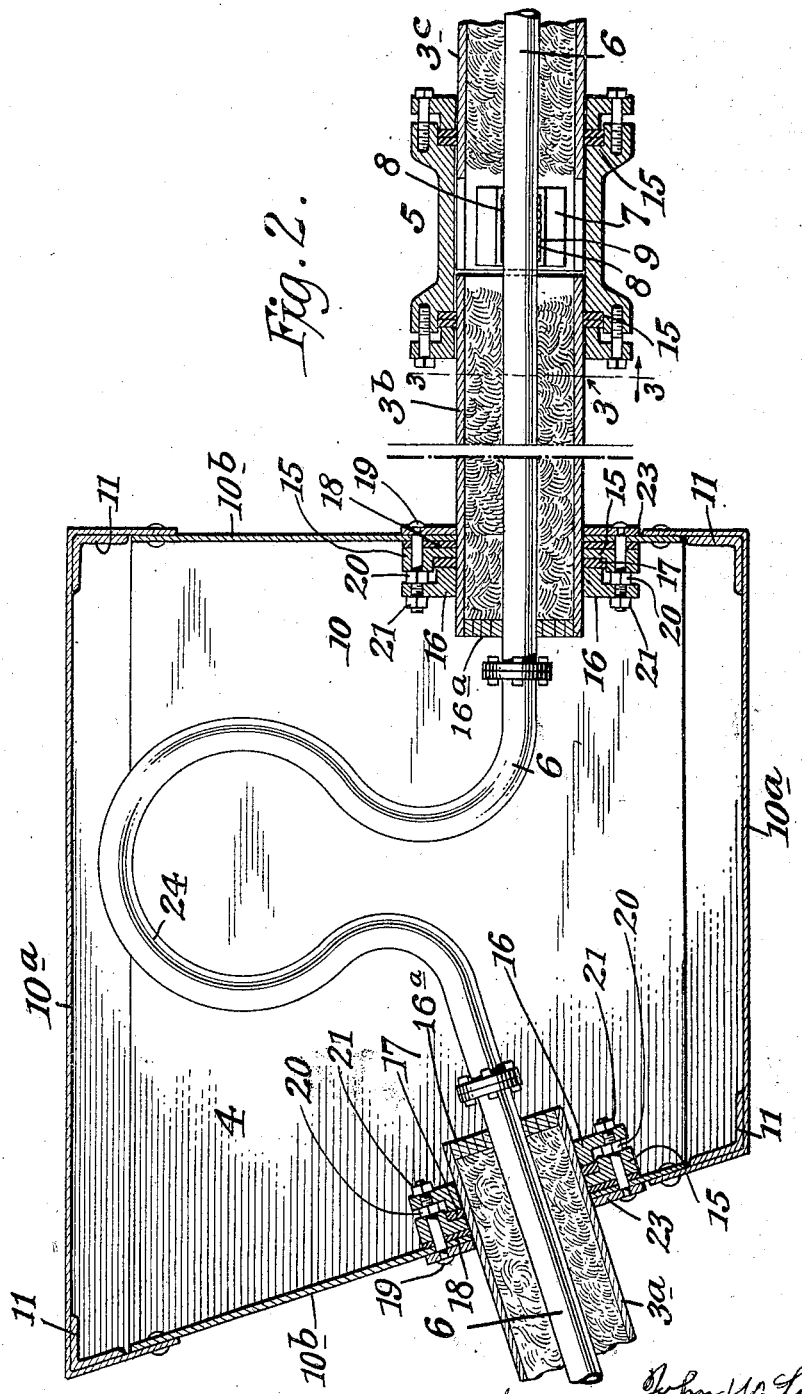

Patented Aug. 28, 1923.

1,466,054

UNITED STATES PATENT OFFICE.

JOHN WM. LATIMER, OF CLEVELAND, OHIO, ASSIGNOR TO JOHNS-MANVILLE INCORPORATED, A CORPORATION OF NEW YORK.

WATER-TIGHT PIPE CONDUIT.

Application filed November 18, 1919. Serial No. 338,788.

*To all whom it may concern:*

Be it known that I, JOHN W. LATIMER, a citizen of the United States of America, residing at Cleveland, county of Cuyahoga, State of Ohio, have invented certain new and useful Improvements in Water-Tight Pipe Conduits, of which the following is a specification.

My invention relates to conduit systems for containing and protecting underground fluid carrying pipes and the like from the action of water and moisture of earth and for reducing as far as possible the transfer of heat from such pipes, and vice versa.

There are two kinds of systems. First— those commonly employed where a number of more or less scattered buildings are heated from a single steam plant or boiler house. The pipes conveying steam or hot water from the boiler plant to the various buildings are buried in the ground and, to prevent great transfer of heat, these pipes must be surrounded by thick bodies of heat-non-conducting materials. This material is usually friable and liable to absorb moisture, which will destroy its insulating qualities. Consequently it must be protected by a strong, watertight envelope, such as a series of larger iron pipes or conduits. On account of the great movement of the steam pipe due to expansion and contraction and on account of the lesser movement of the conduit due to expansion and contraction (it being understood that there will be less heat coming in contact with the outer enveloping conduit on account of the insulation), the steam pipe is anchored to the conduit and the conduit itself is anchored either at the end or the center of the run; and a rather elaborate arrangement of expansion joints and sections is needed to permit of relative movements of the parts, under varying temperatures, without destroying the watertight character of the protecting structure.

Second,—pipe systems carrying chemicals or refrigerating substances, such as sulphur dioxide or ammonia, also, air lines connecting the central plant with buildings wherein refrigeration or air apparatus is used. The pipes conveying these fluids from the central plant to the various buildings containing refrigerators, chemical apparatus or air driven machinery, are buried in the ground and to prevent great transfer of heat they must be surrounded by heavy bodies of heat-non-conducting materials. These materials are likewise friable and liable to absorb moisture which will destroy their insulating qualities. They, also, must be protected by strong, watertight envelopes such as a series of larger iron pipes or conduit. As these pipes and conduit are subjected to varying temperatures, there is likely to be a movement of one within the other due to expansion and subsequent contraction. Consequently anchoring is necessary either at the center or both ends of both pipe and conduit, and a rather elaborate arrangement of expansion joints and sections is needed to permit of relative movement of parts caused by expansion or contraction under varying temperatures, without destroying the watertight character of the protecting structure. Especially is this true of both systems when more or less of the system is buried in marshy ground or ground liable to be flooded by heavy rains, or where the system is buried beneath a creek, river or any moving body of water. My invention is designed to provide a conduit system, preferably of metal, which meets all these requirements. The best form of apparatus at present known to me, embodying my invention is illustrated in the accompanying drawings, in which, Fig. 1 is a diagram of a portion of a conduit system to which my invention is applied.

Fig. 2 is a detail horizontal section on an enlarged scale of a portion of the system, parts being broken away.

Fig. 3 is a vertical cross section on line 3—3 of Fig. 2, and

Fig. 4 is a detail vertical section through part of the cover and one wall of the expansion pit and manhole structure.

Throughout the drawings like reference characters indicate like parts.

1, represents the boiler house or power plant wherein a boiler, refrigerating machine, chemical compressing machine or air compressor is located, and 2, a building to be heated, or in which a refrigerator is located, a chemical plant or one in which an air driven apparatus is located. 3, indicates generally a line of conduit connecting these two, and 4, one of the expansion pits and manholes in said line of conduit. Preferably the conduit is composed of sections of iron pipe 3ª, 3ᵇ, etc. held together by couplings 5, 5. The fluid tight pipe or pipes 6, runs through the conduit from the boiler house, refrigerating machine room, etc. to building 2, for conveying steam, hot water, liquid chemicals or air from the power plant to the building to be heated or in which refrigerators, chemical apparatus or air apparatus is used. The remaining space in the conduit 3, between it and the pipe or pipes, is usually filled with a loose non-heat-conducting material such as asbestos, magnesia, asbestos sponge conduit insulation, hair felt, fine regranulated cork, or molded cork to fit pipe or some similar heat-non-conducting substance, and the pipe or pipes 6, are supported substantially in the conduit by a series of saddles 7, 7 located in the conduit and grooved at 8, 8 to receive the balls or rollers 9, 9 on which the pipe or pipes 6 may rest. As grooves 8, 8 extend parallel to the common axis of pipe and conduit, the balls will roll along these grooves and serve as anti-friction bearings for the pipe whenever the pipe moves.

10, represents one of the boxes forming the water-tight expansion or anchor pit and manhole structure 4. It is preferably formed of metal. The expansion pit structure both takes up the expansion and contraction of the pipe and conduit without interfering with the water-tight character of the latter, as well as serving as an intermediate anchorage for both.

The pipes are anchored at their ends at 1 and 2, and as they expand or contract at different seasons and time of day, some give-and-take mechanism must be included in the system to prevent rupture. This is taken care of by the expansion joints located in the expansion pits. The box 10, of such pit is preferably formed of plates 10ª, 10ᵇ, lap riveted together and spot-riveted together and spot-welded to angle irons 11, at the corners to stiffen the structure. The cover 12, is screwed down on gasket 13, supported by angle iron 14, running around the top of the box and riveted to the walls thereof, so that a water tight closure is effected.

The adjacent conduit sections 3ª, 3ᵇ, enter the box 10, through holes in the side walls which are surrounded by stuffing boxes 15, 15, having the usual glands 16, 16, and packing 17, 17. The stuffing boxes make a water-tight joint with the manhole wall by reason of the gaskets 18, 18 between them and said walls which are compressed by bolts 19, 19, which pass through holes in the walls, in the stuffing boxes, and in the flanges of the glands. Nuts 20, 20 on bolts 19, 19 securely hold the stuffing box body to the wall and nuts 21, 21 serve to force glands 16, 16 down on packing 17, 17 to form water-tight unions with the conduit sections projecting into the manhole. Preferably plates 23, 23 are employed on the outside of the box to form a strong anchorage for bolts 19, 19.

16ª, is a shutter of brick or metal or other material surrounding the pipe 6, passing through the shutter 16ª, in order to keep the filling from falling out of the conduit and from around the pipe.

The portion of the pipe 6, lying in each expansion pit is given a curved form or loop, as shown at 24, so as to create a flexible section that will bend and accommodate itself to linear expansion or contraction of the pipe or other parts.

When pipe 6 expands or contracts as steam is turned on or off, or from other causes, the bent portions 24, flex, and move about in the expansion pit, 4, (Figure 1,) to suit requirements. Access to the expansion sections can be obtained by removing cover 12. The movements of the pipe or pipes 6 are facilitated by the ball bearings 9, rolling freely in grooves 8, 8. Similarly expansion and contraction of conduit 3, is permitted by the sections sliding in or out through stuffing boxes 15, 15, and without disturbing the water-tight character of the entire conduit system. Any insulation materials in the conduit are consequently kept dry and in most efficient condition. The elements of the system can all be readily assembled or taken apart with a wrench, so that ease and rapidity of installation and repairs is secured.

Having described my invention, I claim:

1. In a system of watertight conduits for containing steam pipes and similar pipes subject to expansion and contraction the combination of a plurality of conduit sections of metal piping, a manhole structure connecting two of said sections, a water-tight expansion joint at each connection of a conduit section to the manhole structure and a fluid-tight pipe located in said conduit, anchored in the conduit on either side of the manhole structure, and having a curved, flexible section located in the manhole.

2. In a system of water-tight conduits for containing steam pipes and similar pipes subject to contraction and expansion, the combination of a plurality of sections of metal piping serving as such conduit, a manhole structure having stuffing boxes mounted in its walls in which stuffing boxes are fitted the ends of certain of said conduit forming pipe sections and a fluid-tight pipe located in said conduit anchored therein on either side of the manhole structure, and having a curved, flexible section located in said manhole structure.

3. In a system of water-tight conduits for containing steam and other pipes the combination, with a metal box serving as an expansion pit and manhole having an opening in one wall and a section of metal conduit projecting through said opening, of a stuffing box and gland surrounding said conduit, a gasket between the stuffing box and pit wall, and a plurality of bolts passing through the wall, the stuffing box and the flange of the gland and adapted to hold the stuffing box to the wall and to force the gland into the stuffing box.

JOHN WM. LATIMER.

Witnesses:
T. J. GUY.
R. W. ELLIOTT.